United States Patent [19]

Gangluff et al.

[11] 4,344,374
[45] Aug. 17, 1982

[54] HEAVY DUTY SEEDLING PLANTER

[76] Inventors: Joseph A. Gangluff, Rte. 1, Hattieville, Ark. 72063; Wayne F. Charton, Rte. 2, Box 182 A, Morrilton, Ark. 72110

[21] Appl. No.: 231,046

[22] Filed: Feb. 2, 1981

[51] Int. Cl.³ .......................................... A01C 11/02
[52] U.S. Cl. ......................................... 111/2; 111/3; 111/85
[58] Field of Search ......................................... 111/2, 3

[56] References Cited

U.S. PATENT DOCUMENTS

| 490,942 | 1/1893 | Bender et al. | 111/3 |
|---|---|---|---|
| 1,753,017 | 4/1930 | Oppenheim | 111/3 X |
| 1,906,139 | 4/1933 | Denstadt et al. | 111/2 |
| 1,972,281 | 9/1934 | Walling | 111/3 X |
| 2,335,132 | 11/1943 | Pomieraniek | 111/2 |
| 2,463,938 | 3/1949 | Bancroft | 111/3 |
| 2,725,022 | 11/1955 | Pettersen | 111/3 |
| 2,887,075 | 5/1959 | Linkogel | 111/3 |
| 2,944,495 | 7/1960 | Wilson et al. | 111/2 |
| 3,261,310 | 7/1966 | Cronk et al. | 111/3 |
| 3,643,611 | 2/1972 | Owens et al. | 111/2 |
| 4,026,225 | 5/1977 | Vink | 111/2 |

FOREIGN PATENT DOCUMENTS

| 84811 | 5/1958 | Denmark | 111/3 |
|---|---|---|---|
| 2301332 | 8/1973 | Fed. Rep. of Germany | 111/3 |
| 611144 | 10/1960 | Italy | 111/3 |
| 7601578 | 8/1977 | Netherlands | 111/3 |
| 155686 | 8/1962 | U.S.S.R. | 111/3 |
| 680677 | 8/1979 | U.S.S.R. | 111/3 |

Primary Examiner—Steven A. Bratlie
Attorney, Agent, or Firm—Stephen D. Carver

[57] ABSTRACT

A heavy duty machine for planting tree seedlings or similar plants. The planter comprises an elongated, rigid frame to which a rotatable coulter wheel is centrally secured for initially cutting a furrow. A rigid plow downwardly depending from the frame is ground engaging contact widens the furrow. Seedlings are inserted into the furrow by a rotary feeder wheel system including a plurality of radially spaced-apart, resilient, seedling receptive hands secured to a centrally disposed, rotatable hub. The hub is preferably linked to the coulter wheel for forced rotation. The feed hands are rotated through a closing system including a narrow, receptive slot which maintains the hands in closed position until they are rotated into a seedling dispensing position above the furrow, whereupon the hands open and seedlings are released. A repacking system including rigid, inclined, compacting wheels closes the furrow about the seedling roots to complete the planting process. Means are provided to adjust the operating position of the coulter wheel and the compaction wheels.

6 Claims, 14 Drawing Figures

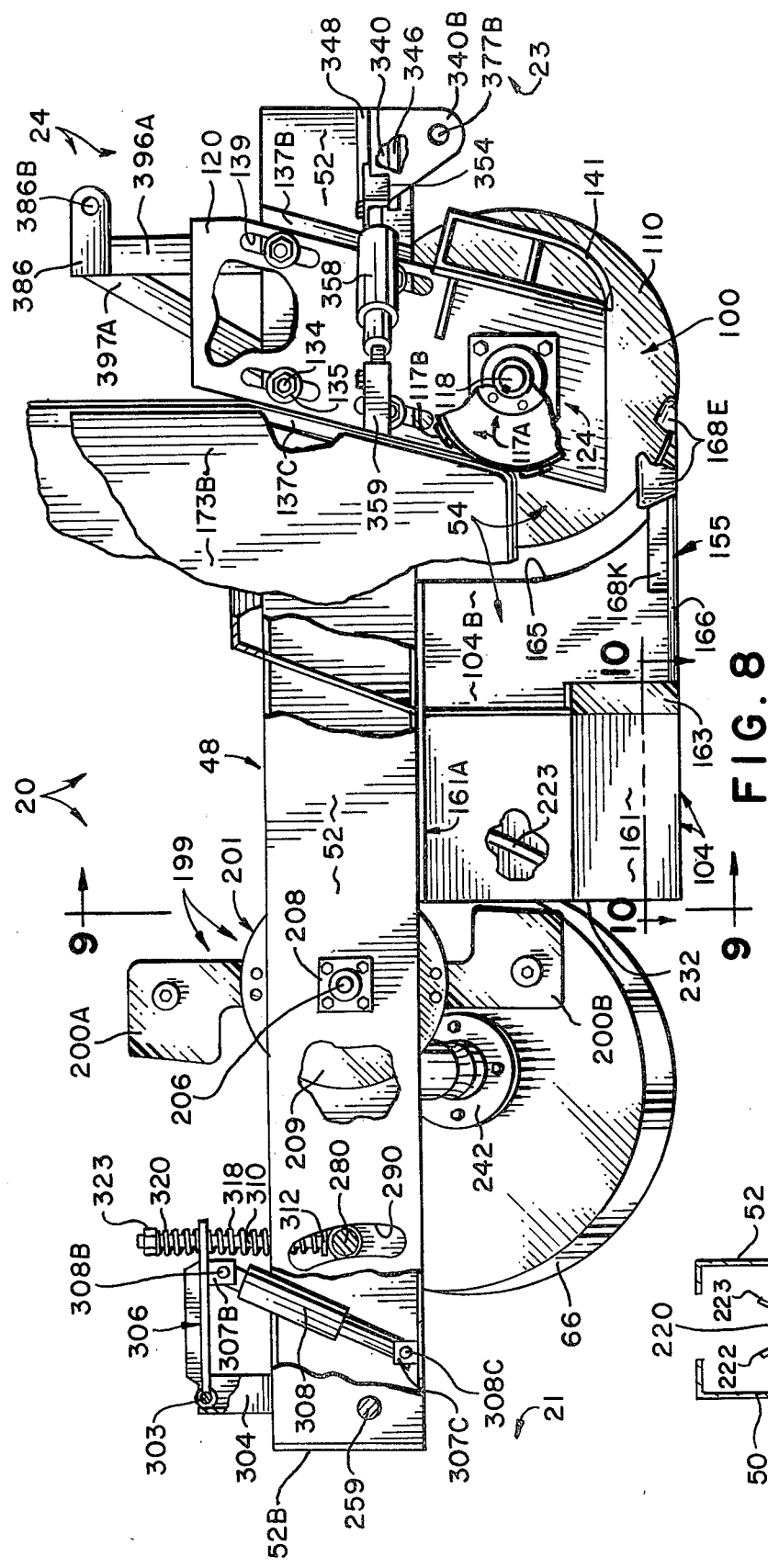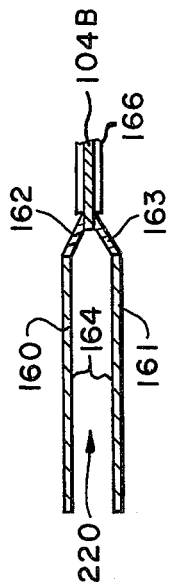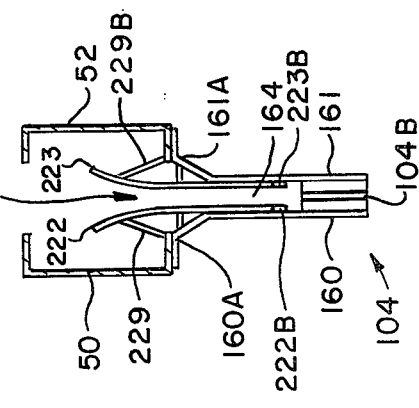

HEAVY DUTY SEEDLING PLANTER

BACKGROUND OF THE INVENTION

This invention relates to seedling planting devices. More particularly, the present invention is directed to a heavy duty tree seedling planting device adapted to open a furrow, insert a seedling therein, and repack the furrow to complete the planting process. The invention is believed most relevantly classified within United States Class 111.

In the prior art a variety of mechanized systems have previously been employed to plant tree seedlings or similar plants. Devices of this nature are of particular importance to the timber industry, which must plant millions of seedlings each year to properly maintain an inventory of developing trees.

Prior art mechanized planting systems generally employ a rigid structure including downwardly projecting, ground-engaging coulter plates and associated plow structure for opening a furrow. Various forms of automated or mechanized seedling feeder systems have been suggested to facilitate displacement of the seedlings from a remote hopper into proper position within the furrow. For example, it is well known to employ some form of mechanical picks or other members moved via chains or other drive means between seedling receptive and seedling dispensing positions. It is also known in the art to repack furrows with inclined repacking wheels.

The following prior art United States Patents incorporate one or more of the aforementioned principles: U.S. Pat. Nos. 2,463,938; 1,972,281; 2,887,075; 1,906,139; 2,335,132; and 2,725,022. Examples of prior art patents which are believed most relevant to the present invention are U.S. Pat. Nos. 3,261,310; 3,643,611; and, 4,026,225.

Our experience has indicated that known prior art devices are generally unsuitable for dependable and continuous use in areas characterized by steep slopes and irregular terrain. Moreover, maneuverability of known prior art planters is severely compromised in extremely rocky soil, or soil in which other obstacles such as tree roots or the like may be encountered. While lighter models or designs of treeplanters will facilitate maneuverability, known lightweight machines are notoriously unreliable. For example, lightweight frames may become twisted or bent. Typically rubber compaction wheels, which tend to wear out or become punctured in extremely rough terrain, are used with lighter planters.

Heavier planters may be of sufficient strength to avoid damage to the frame or the plow assembly when rocks or other obstacles are encountered. However, the coulter wheel and the seedling feeding systems typically remain vulnerable to injury. One of the main problems with prior art systems is that the compaction wheels are not mounted for remote manipulation. Moreover, some prior art towing systems make it difficult to quickly maneuver the coulter wheel around buried obstacles.

Typically some form of feeding system is employed to transfer seedlings from storage hoppers to the furrow. A variety of machanized seedling conveyance systems have been suggested by the prior art. Such systems suffer from two main disadvantages. First, reliability of such systems is often compromised by the extremely hostile conditions encountered in practice. As mentioned, the land upon which trees are raised is often inhospitable to mechanized devices. Moreover, the planting season dictates use in the coldest and often wettest time of the year.

Another feeder problem concerns operator safety. Several instances of employee injury have occurred in the past from treeplanter feeding systems employing mechanized seedling picks or the like, which often come into inadvertent contact with the operators hand. Contact can occur, for example, when the unit unexpectedly encounters a severe bump or obstacle as it is being towed. Such shocks may throw the cab occupant into contact with the feeder. Thus a feeder which is incapable of injuring the operator, but which will function reliably in severe conditions of use, is clearly necessary.

SUMMARY OF THE INVENTION

The present invention comprises a device for planting tree seedlings or the like.

Preferably the invention comprises an elongated, rigid frame of heavyweight, preferably metallic construction. A furrow cutting system is secured to the frame, and downwardly projects therefrom into ground engaging contact. The furrow cutting system preferably employs a rigid rotatable coulter wheel mounted for rotation with respect to the frame, and an adjacent, intermediately positioned plow. The plow includes a pair of downwardly, extending, forwardly converging plates which terminate in a removable subsoil tip positioned near the coulter plate. The subsoil tip may be replaced as necessary by the operator when it periodically wears out.

A rotatable, wheeled feeder system is preferably employed to position seedlings in the furrow. A plurality of deformable hands are attached to a rotatable hub at radially spaced-apart intervals about the circumference thereof. The hands extend generally radially outwardly from the axis of rotation, and are rotated from seedling receptive positions to seedling dispensing positions. A planter operator may quickly and easily manually insert seedlings within the hands when they are disposed within the seedling receptive position. As the hands are rotated downwardly toward the furrow, they preferably are passed through a hand compression system employing a pair of arcuate rails, at least a portion of which are secured within the plow rear section, on opposite sides of the plow plates. A hand closing slot is thus formed whereby to prevent inadvertent escape of seedlings during hand rotation.

Preferably the feed wheel is coupled to a one-way clutch which prevents inadvertent reverse rotation, whereby to prevent operator injury and inadvertent seedling release. The feed wheel may be coupled to the coulter wheel via an elongated chain, whereby to control feeder speed and effectuate proper tree seedling spacing. The chain is linked about conventional sprockets coupled to the feeder and the coulter. The sprockets may be changed by the operator, to adjust seedling spacing by varying gear ratios.

Furrow repacking is effectuated by a compaction system of heavy duty characteristics. Preferably the compaction system comprises a pair of large, heavyweight, metallic compacting wheels which are rotatably secured in spaced-apart, inclined relation relative to the frame. In a preferred form of the invention means are provided to vary the angle of inclination of the packer wheels whereby to adapt the unit for use with soils of different characteristics. The compaction wheels are preferably mounted for vertical movement relative to the frame, and they may be shifted between ground engaging and ground-clearing positions from a remote position. The compaction wheel mounting systems are coupled together with a transverse rod received throughd an elongated follower slot provided in the frame.

The preferred embodiment of the planter machine is adapted to be towed by a conventional crawler tractor or the like. Operational maneuverability and stability are enhanced by a "fifth wheel" towing system which enables the device to ease around stumps, curves, stones or the like. To this effect a planar, horizontally oriented towing plate is pivotally secured to the frame for limited, compensating movement. A pair of shock absorbers mounted between opposite lateral edges of the plate and the cab increase control.

Thus a primary object of the present invention is to provide a reliable and dependable machine for dispensing or planting tree seedlings or the like.

Moreover, it is an object of the present invention to provide a heavy duty tree seedling planter of extreme reliability, safety, maneuverability, and stability.

Another object of the present invention is to provide a tree planting device with a seedling feeding system which will inherently resist damage which may be caused from the extremely rough terrain and conditions encountered in use.

Yet another object of the present invention is to provide an extremely safe seedling planter. It is an important feature of this invention that it is virtually impossible for the operator to injure himself upon the feed wheel system.

Yet another object of the present invention is to provide systems for operationally varying the positions of the planter coulter wheel and compacting wheel systems.

Another object of the present invention is to provide a seedling feeding system designed to prevent operator injury, which system will reliably convey seedlings to the planting furrow.

Another object of the present invention is to provide a planting system of the character described in which the operator may control the degree of furrow compaction during seedling planting. It is a feature of the present invention that the packer wheel system may be varied in height relative to ground as desired by the tractor operator.

A more basic object is to provide a seedling planter adapted for use with extremely rocky soil or steep slopes.

Yet another object of the present invention is to provide a planter of the character described which contributes to enhanced livability of seedlings.

A similar object of the present invention is to provide a planting device of the character described adapted to accurately space seedlings at desired intervals.

A still further object of the present invention is to enhance operator safety and comfort.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed to indicate like parts in the various views:

FIG. 8 is a side sectional view of the invention with parts thereof broken away or omitted for clarity, illustrating an opposite side thereof;

FIG. 9 is a sectional view taken generally along line 9—9 in FIG. 8 and reduced in scale, the view illustrating the feeder hand compression system, with parts broken away or omitted for clarity;

FIG. 10 is a sectional view taken generally along line 10—10 in FIG. 8;

DETAILED DESCRIPTION OF THE DRAWINGS

Figure 1:
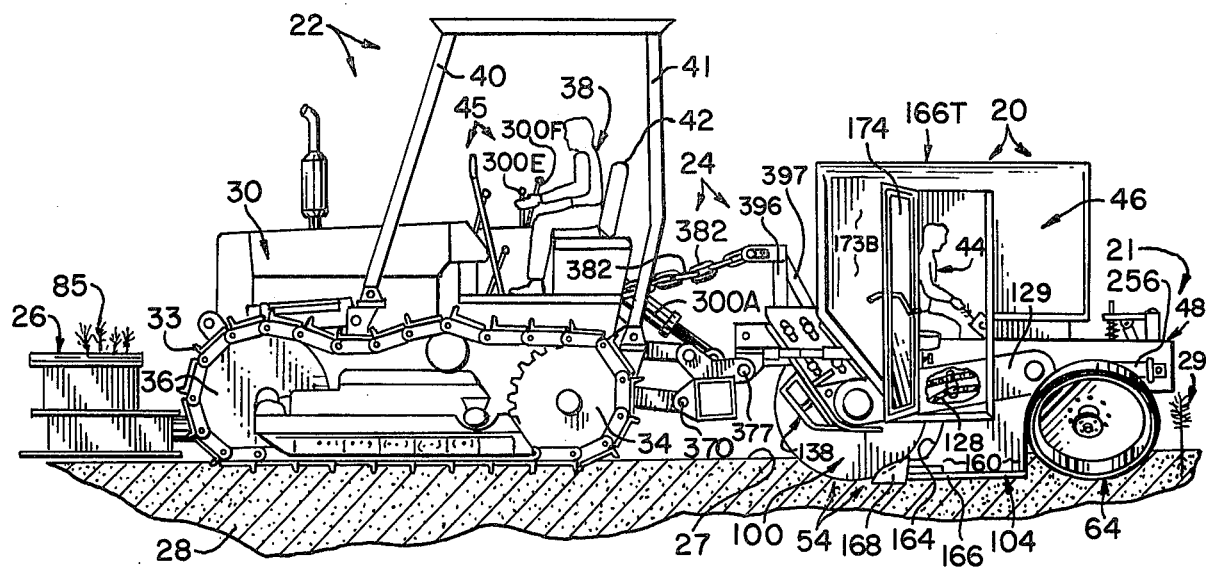
FIG. 1 is a pictorial view of a planter constructed in accordance with the teachings of this invention, the planter illustrated in operation being towed by a conventional crawler tractor.

With reference now to FIG. 1, a planter device constructed in accordance with the teachings of this invention is generally designated by the reference numeral 20. Planter 20 is adapted to be towed by a conventional vehicle such as a crawler tractor generally designated by the reference numeral 22. While planter 20 may be towed by a tractor 22 via a plurality of conventional hitching systems, a preferred coupling system, generally designated by the reference numeral 24, is employed. An optional "V" blade, generally designated by the reference numeral 26, is secured at the front of the tractor 22 to remove or clear logs, brush, or other obstacles which may be encountered on the surface 27 of ground 28 in which seedlings 29, 85 are to be planted.

Tractor 22 is completely conventional, and includes a chasis 30 propelled by a track 33 disposed over conventional cog drive wheels 34, 36. Tractor 22 is controlled by a human driver 38, normally positioned within cab 40 upon a seat 42. A plurality of conventional lever controls are disposed within cab 40 for operating tractor 22 and for actuating a conventional hydraulic system, which, as will later be described, operates suitable hydraulic cylinders for controlling planter 20. Driver 38 cooperates with operator 44 seated within the optional cab enclosure 46 of planter 20. A rubber tire tractor may also be used.

Figure 5:
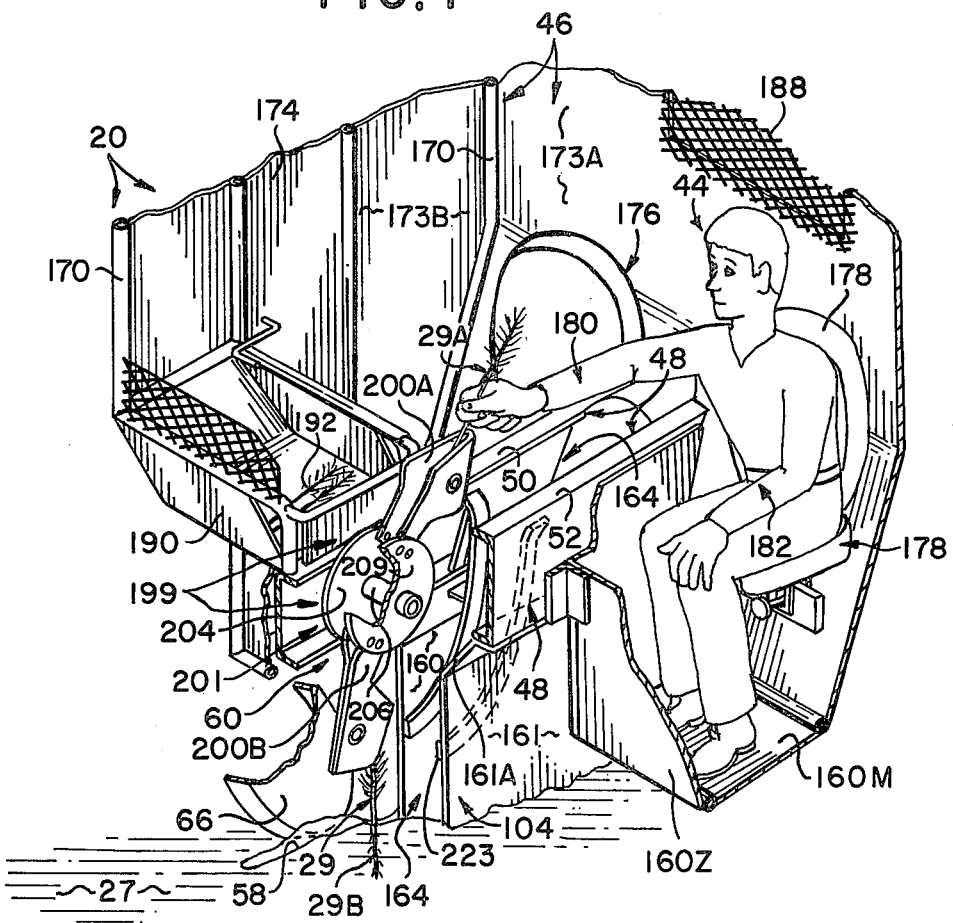
FIG. 5 is an enlarged, pictorial view of the interior of the planter cab, illustrating portions of the rotating seedling feeder means, and with parts thereof broken away or shown in section for clarity or omitted for brevity.
Figure 6:
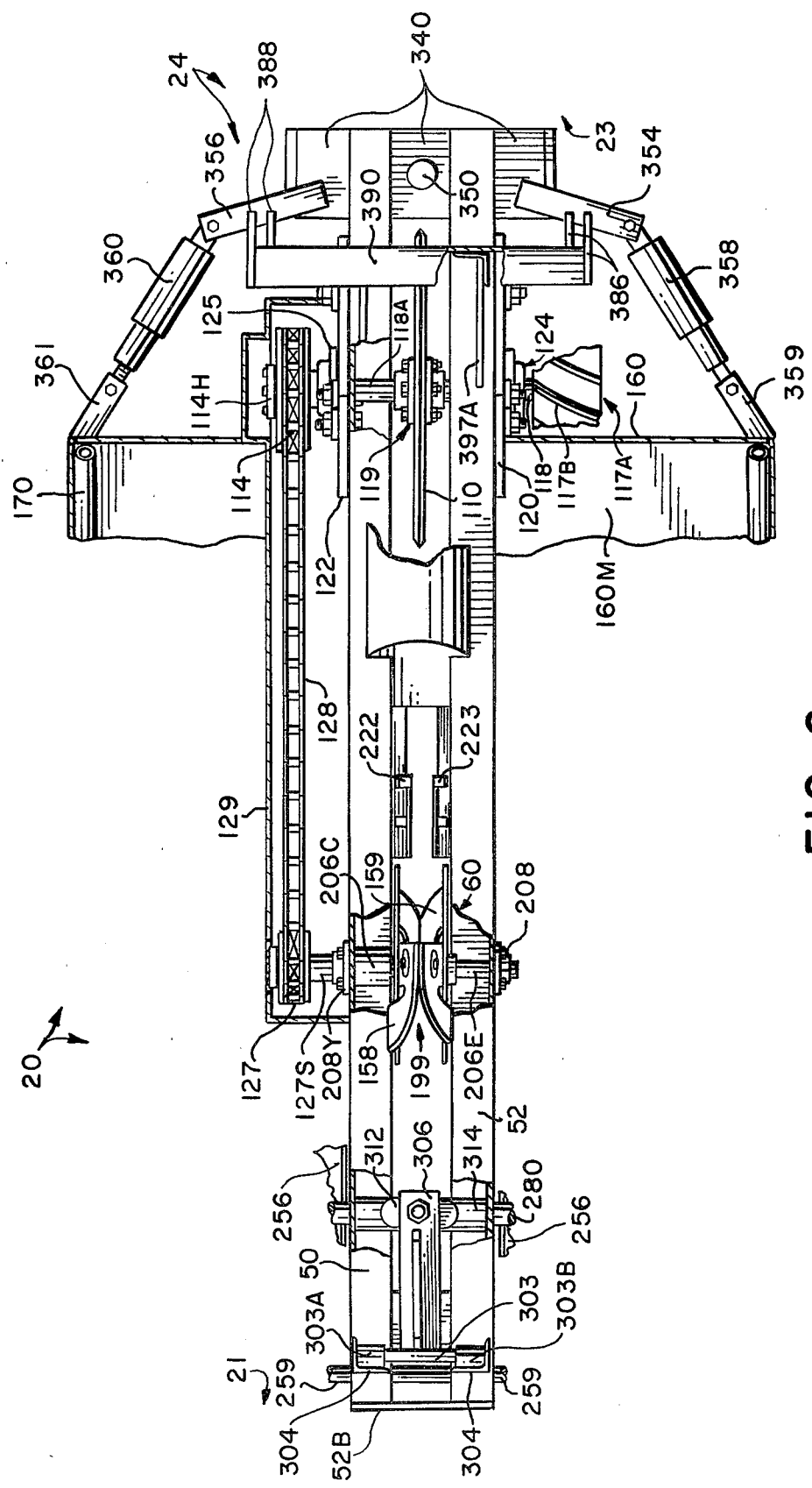
FIG. 6 is an enlarged top plan view of the treeplanter with parts thereof broken away, omitted, or shown in section for clarity.
Figure 7:
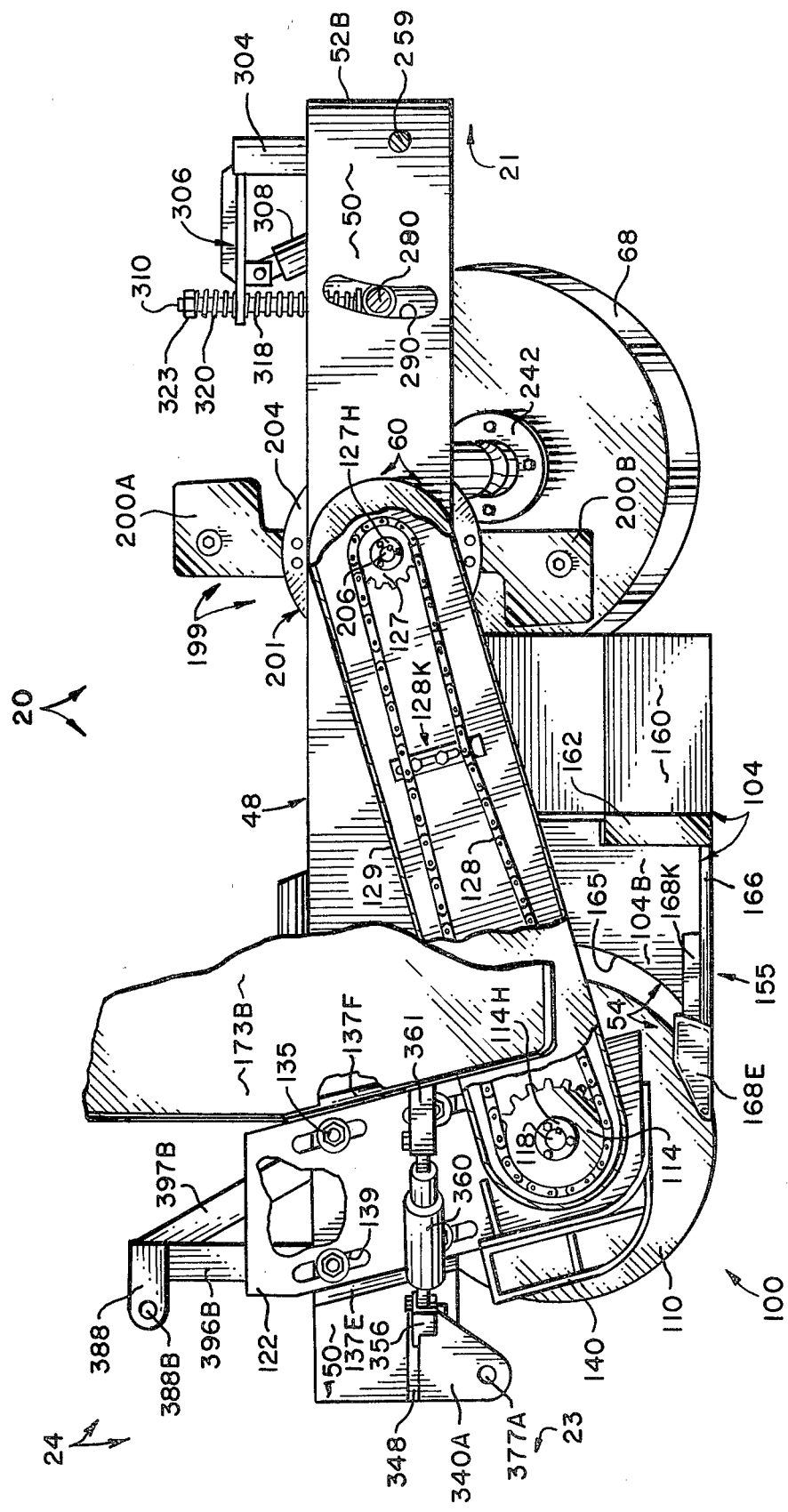
FIG. 7 is an enlarged, side sectional view of the invention, with parts thereof broken away or omitted for clarity.
Figure 14:
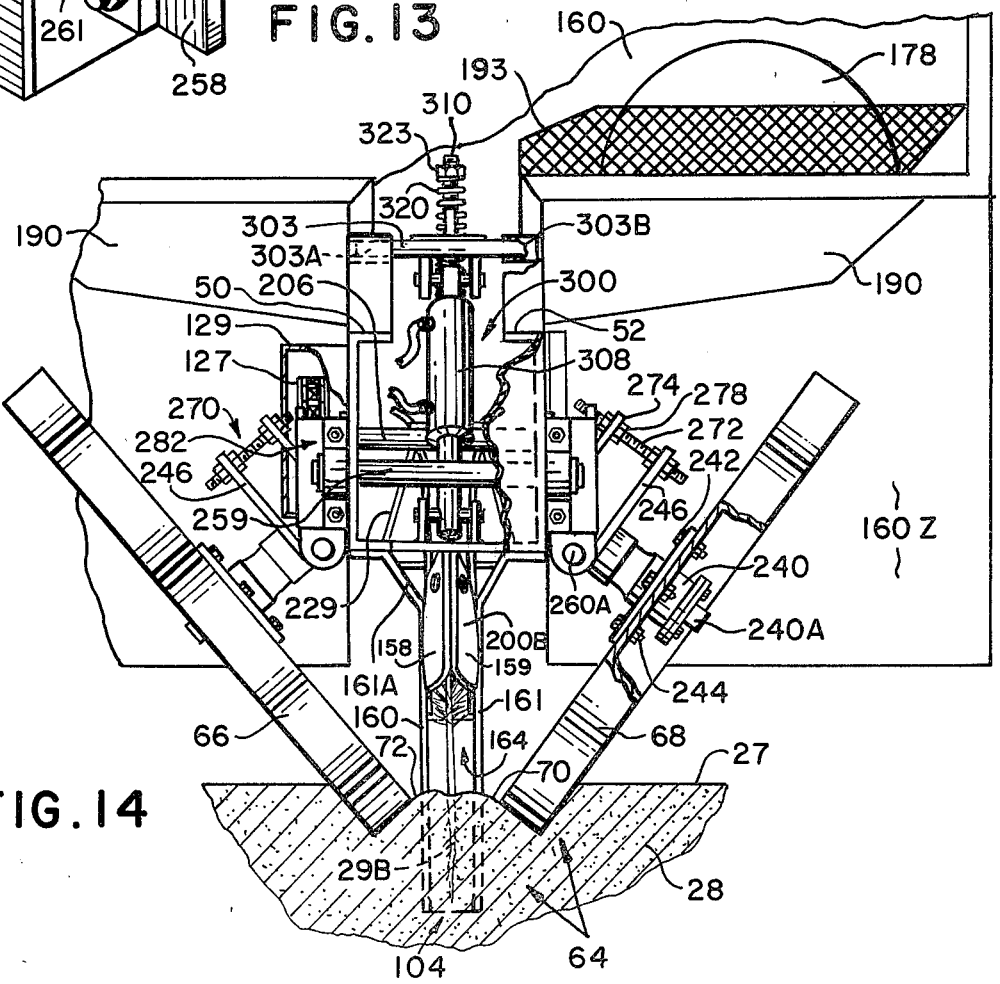

With additional reference now to FIGS. 6-8, planter 20 includes an elongated, heavy, metallic, rigid frame 48 formed primarily from a pair of spaced-apart, rigid steel channels 50, 52 rigidly joined at the rear 21 of the planter by a plate 52B. Coupling system 24 which enables the invention 20 to be towed is secured to the front of the frame 48. Preferably planter 20 includes a furrow cutting system, generally designated by the reference numeral 54 (FIG. 1) which is secured to the frame and depends downwardly therefrom into ground engaging contact. As the planter 20 is displaced relative to ground surface 27 a furrow 58 (FIG. 5) will be opened. Seedlings 29, 29A are fed by a rotary feeder system, generally designated by the reference number 60, into proper placement within the furrow 58. Immediately after the seedlings 29 are inserted into the furrow 58, ground or earth is subsequently compacted or repacked by a compaction system generally designated by the reference numeral 64 (FIGS. 1, 14). The compaction system, which will later be described in detail, includes a pair of rigid, preferably metallic wheels 66, 68 mounted on opposite rear sides of the frame 48 for contacting and compressing side portions 70, 72 (FIGS. 11, 14) of the furrow 58. In this manner the roots 29B of the seedlings will be adequately secured in firm earth for dependable seedling maturation.

Figure 2:
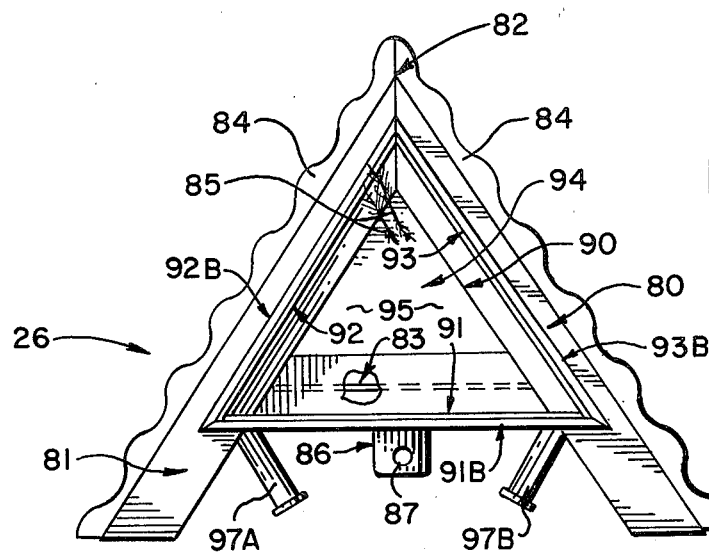
FIG. 2 is a top plan view of an optional tractor blade preferably employed in conjunction with the present invention.
Figure 3:
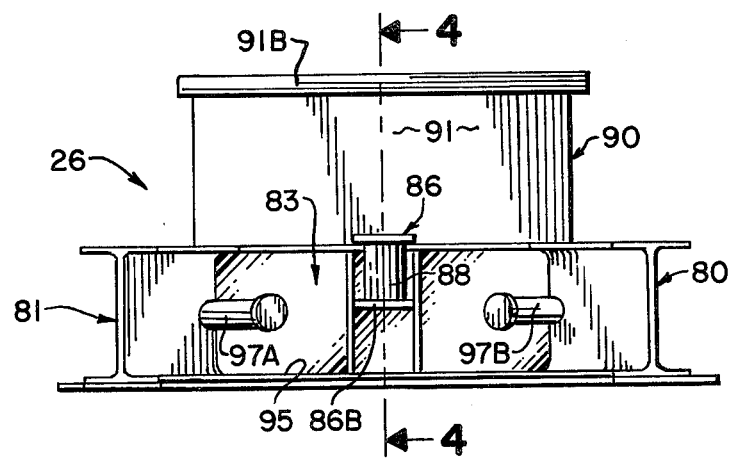
FIG. 3 is a rear plan view of the blade shown in FIG. 2.
Figure 4:
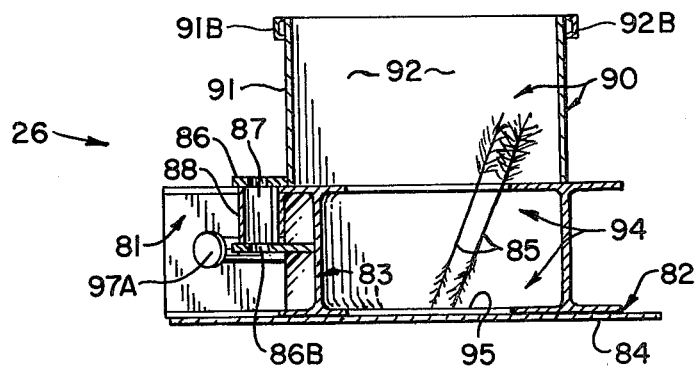
FIG. 4 is a sectional view taken generally through section line 4—4 of FIG. 3.

Turning now to FIGS. 2-4, the optional brush clearance blade 26 is of a tapered, triangular profile, and is formed from rigid, intersecting I-beams 80, 81 which intersect at a point 82. A cross brace 83 forms a rear side thereof. A rigid, lower serrated edge 84 forms a cutting surface adapted to properly manipulate brush first deflected by point 82. Brace 83 supports rearwardly projecting, vertically spaced-apart mounting tabs 86, 86B which secure mounting sleeve 88 in alignment relative to orifice 87. A suitable link secured to the front of tractor 22 may be coupled to tabs 86, 86B with a conventional mounting pin inserted through orifices 87. Bumbers 97A, 97B project rearwardly from I beams 81, 80 respectively, to which they are welded. The bumbers contact the front plate portion of the tractor crawler 22 to align blade 26.

Thus a lower hopper 94 is formed between I-beams 80, 81, and 82. Seedlings 85 may be stored therein upon bottom 95. The uppermost hopper portion 90 is formed above hopper 94 by sides 91, 92, 93, the upper edges of which are braced by reinforcements 91B, 92B, and 93B respectively.

With particular attention to FIGS. 6-8, and 11, the furrow cutting system 54 comprises a rigid coulter wheel assembly generally designated by the reference numeral 100, for initially opening a furrow in ground 27, and an adjacently positioned cooperating plow assembly, generally designated by the reference numeral 104. Both assemblies 100, 104 are centered with respect to frame members 50, 52, and are operatively secured thereto.

The coulter system 100 includes a rigid, preferably circular coulter blade 110 centrally secured between mounting hubs 119. Coulter axle 118 is keyed to hub means 119 and extends through spacer sleeves 118A, 118B, through side-mounted, rigid coulter mounting plates 120, 122 disposed on opposite sides of the frame, and is journaled through mandrels 124, 125, respectively disposed at the lowermost, outer sides of plates 120, 122. Axle 118 extends outwardly of mandrel 125 (FIGS. 6,7) and is keyed to chain drive sprocket 114 and secured terminally by hub mount 114H. An endless chain 128 confined within housing 129 is tracked about drive sprocket 114 and feeder gear 127 (FIGS. 6, 7, 14). In this manner the coulter blade 110 will rotate the feed wheel system. For positive rotation in wet soil, optional metallic wheel 117A (FIGS. 8,6) including treads 117B is secured to axle 118 to rotate the coulter in response to ground contact.

Each of the coulter mounting plates 120, 122 are of planar, generally rectangular construction and are formed of rigid steel or the like (FIGS. 6-8). Each plate includes a plurality of elongated, mounting slots 139 which receive studs 134 for securing the coulter plate in proper operative position in cooperation with nuts 135. Thus, for example, as the coulter wheel 110 eventually wears out, or as deeper furrows are desired by the operator, the nuts 135 may be loosened whereby to permit relative vertical displacement of the coulter wheel. The plow is supported by the mounting system 24 and by skids 140, 141 of conventional arcuate profile. Skids 140, 141 are thus disposed on opposite sides of the coulter wheel 110.

As viewed in FIGS. 6-8 and 11 coulter mounting plate 120 is secured between elongated, rigid guide braces 137B, 137C welded to frame member 52. Similarly, opposite coulter mounting plate 122 is retained between guide braces 137E, 137F. The coulter plate braces are oriented parallel with the coulter mounting plate slots 139 facilitating vertical positional adjustments to the coulter wheel 110, while preventing inadvertent displacement of wheel 110 longitudinally relative to frame 48.

With reference now to FIGS. 5-9, 11, the plow system, generally designated by the reference numeral 104, comprises a pair of spaced-apart, downwardly extending plates 160, 161 secured to frame 48. Plates 160, 161 include upper angled flange portions 160A, 161A respectively, which are bolted to frame beams 50, 52. Plates 160, 161 extend downwardly into ground engaging contact, and the leading front edges of lower portions 162, 163 of the plates 160, 161 converge together, sandwiching a planar plow knife plate 104B therebetween. As will later be explained in detail, a spacing 164 (FIG. 9) is preserved between the rearmost portions of plow plates 160, 161.

Plow knife 104B terminates in an arcuate, knife-like forward edge 165 spaced-apart from coulter 110. The ground engaging lower edge of the knife includes protective reinforcement 166 (FIGS. 8-10) over which the removable sub-soil tip assembly 155 fits. Tip 155, which is adapted to be periodically replaced, includes wear-resistant point 168E supported by fork mount 168K which is press fitted to knife plate 104B, above rail 166. Point 168E is preferably slotted, and a portion of the circumference of coulter blade 110 rides therewithin (FIGS. 6,7).

With particular reference now to FIGS. 5–8 and 14 the feeding system is generally indicated by the reference numeral 60. Feeder 60 includes a feeder wheel system 199 comprising rotatable hub 201 and a plurality of radially spaced-apart hands 200A, 200B formed from folded plastic, rubber or similar resilient material. The hands are secured to hub 201 and form a cup-like enclosure adapted to yieldably receive seedlings such as seedling 29A, or seedlings 192 which are to be planted. Each of the hands 200A, 200B include individual, generally rectangular halves 158, 159 (FIG. 14), narrow base portions of which are secured to sides 204, 209 of hub 201. Halves 204, 209 of rotatable hub 201 are secured for rotation by axle 206 which is mounted by bearing 208 secured to frame channel 52, and opposite bearing 208Y secured within housing 129 to frame channel 50. Axle 206 extends through sleeve spacers 206E, and 127S, clutch 206C (FIG. 6), being secured to feeder wheel sprocket 127 by hub 127H (FIG. 7). Thus, since chain 127 interlinks sprockets 127 and coulter 110, feeder wheel 199 will be rotated. However conventional one-way clutch 206C (FIG. 6) prevents reverse rotation, and allows slip at crucial overloads to minimize feeder damage and prevent operator injury. Clutch 206C is preferably a model 03-31-0068 coupler available from Safeguard Power Transmission Co. and it forms the basis of U.S. Pat. No. 2,233,471. Chain 128 is secured within protective enclosure 129, and is operatively tensioned by conventional tension control mechanism 128K.

Thus hands 200A, 200B are rotated by hub 201 between seedling receptive positions within reach of operator 144 inside cab enclosure 46 and seedling dispensing generally perpendicular to ground 27. Hand 200A is illustrated in a seedling receptive position; hand 200B occupies a seedling dispensing position. During rotation the feeder hands travel through a gap 164 (FIGS. 5,9, 10) formed between frame members 50, 52 and between plow plates 160, 161. Importantly, hand closing means, generally designated by the reference numeral 220, are secured within gap 164 to close hands 200A, 200B after they receive a seedling. Thus hand halves 158, 159 are gently clasped together to temporarily secure the seedling to be planted, and to insure that the seedling is properly positioned relative to the furrow. Once a seedling is dispensed from the released hands, its roots will immediately encounter the pinching effect of the compaction wheels whereby to quickly be secured in the furrow.

Optional cab enclosure 46 (FIG. 5) provides an environmentally comfortable operating position for operator 44. Enclosure 46 includes front wall 173A a pair of side walls 173B, top 166T, floor 160M, and rear 160Z. Edges of the cab structure preferably are reinforced by conventional pipe sections 170. Conventional doors 174, 174B are hinged to the cab sides, and opened with controls 174X. A pair of seats, generally designated by the reference numerals 176, 178, are secured within enclosure 46 on opposite sides of the frame. Thus the arms of 180, 182 of operator 44 may reach hand 200A in the seedling receptive position. If operator 44 is left handed, rather than right handed, he need merely occupy seat 176 whereupon his arm 182 will be more conveniently positioned relative to hands 200A.

Cab 46 includes a window 188 in front wall 173A. The rear of the enclosure 46 is normally open. With reference to FIG. 1, driver 38 may view through the rear wall 41 of his tractor 22 through window 188 to observe feeder operation. Preferably one or more seedling hoppers 190 are disposed at the front of the enclosure 46 on opposite sides of the seedling feeding wheel 199. Hoppers 190 are disposed within a convenient position relative to operator 44, who must grasp seedlings 192 and insert them within the feeding hands 200A or 200B.

With reference to FIGS. 5 and 7–11, the hand closing means 220 is generally disposed within gap 164 created between the spaced-apart plow side plates 160, 161 and the frame members 50, 52. To this effect, the hand closing means includes a pair of generally arcuate, elongated, guide rail members 222, 223, which extend from the bottom of gap 164 and flare upwardly between frame portions 50, 52. The lowermost rail ends 222B, 223B (FIG. 9) may be welded to interior sides of plow panels 160, 161. The intermediate rail portions are secured to plow plates 160, 161, via cross-braces 229, 229B. As best viewed in FIG. 5, the guide rail members 222, 223 are curved to conform to the arc struck by rotation of the hands 200A, 200B. It will thus be appreciated that, immediately after insertion of a seedling into the hand 200A, the hand will be rotated into the hand closing means 220 and hand sides 158, 159 will be compressed slightly between members 222, 223 inside of gap 164. When the hand subsequently exits from the lowermost portion of the hand closing means, the roots 29B (FIG. 5) of seedling 29 will be thrust into the furrow 58 immediately to the rear of the plow plates. Immediately thereafter, the ground or dirt formerly forming the sides of the furrow will be compressed together about the plant 29 by action of the compaction wheel system.

Figure 13:
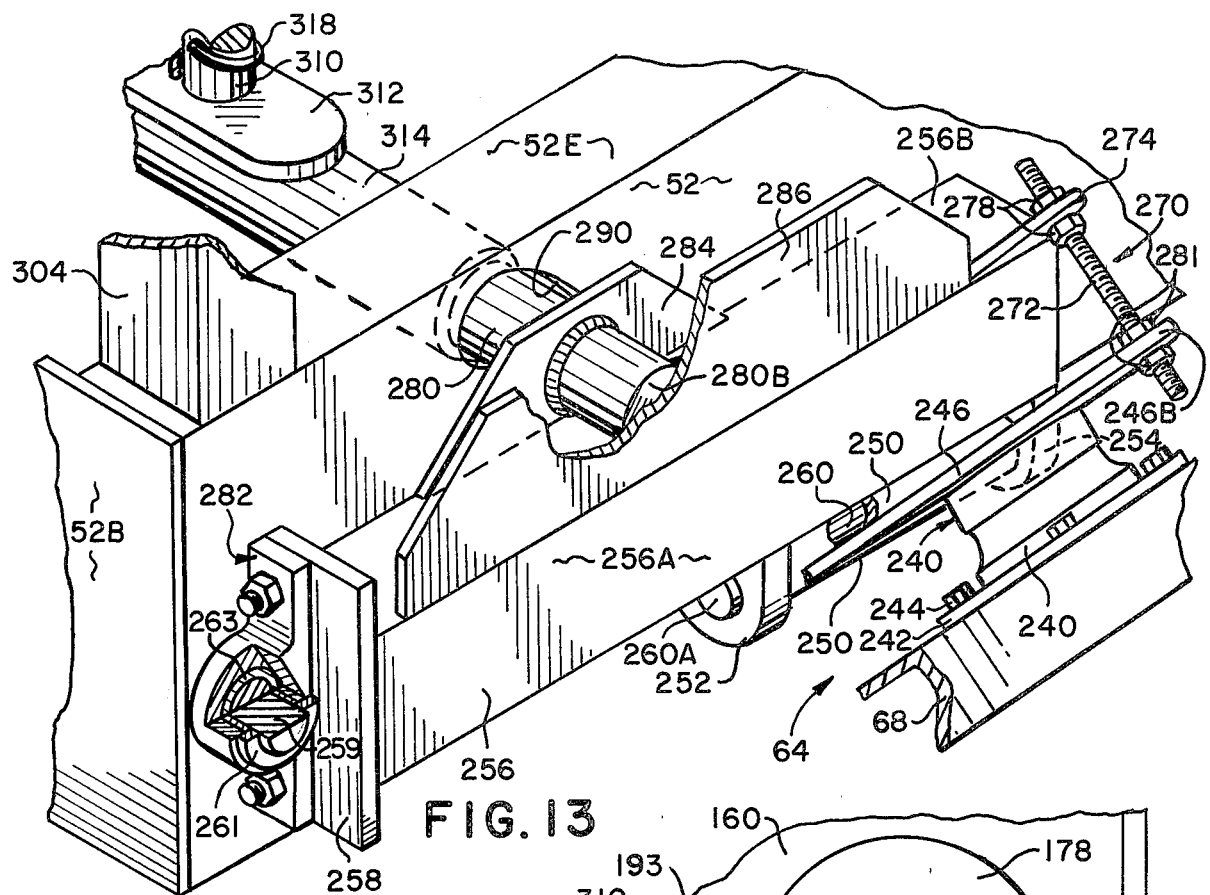
FIG. 13 is an enlarged isometric view illustrating the compaction mounting arm and inclination plate systems, with parts thereof broken away for clarity or omitted for brevity; and, FIG. 14 is a front plan view of the invention with parts thereof broken away, omitted, or shown in section for clarity.

Referring primarily now to FIGS. 13, 14, the compacting system generally designated by the reference numeral 64, includes a pair of spaced-apart, converging and angularly inclined compacting wheels 66, 68 which are rotatably secured for rotation relative to the frame 48. As best viewed in FIG. 14, wheels 66, 68 continuously repack the furrow about roots 29B of seedlings dispensed by the feeding system, as previously discussed. Each of the compacting wheels are of rigid, preferably metallic, heavyweight construction. Means are provided whereby to vary the vertical position of the wheels 66, 68 relative to the ground or the frame, and separate means are provided for varying the angle of inclination as desired. For example, the angle of inclination may be varied where ground moisture conditions vary radically.

It will be appreciated that each of the wheels 66, 68 are mounted to the frame members 50, 52 respectively through similar apparatus. Each of the wheels 66, 68 are secured at their centers with a bearing housing 240 secured to flange 242 fastened with a plurality of bolts 244. The bearing structure is coupled at its opposite end to a rigid, generally planar inclination plate 246 which enables the wheels 66, 68 to be varied in inclination relative to frame 48. To this effect the lowermost portions of the inclination plates 246 are weldably secured to elongated sleeves 250 which are disposed between apertured tabs 252 weldably secured to the lowermost portion of an elongated, rigid, mounting arm 256. A mounting arm 256 is secured on each side of the frame for pivotal movement by pivot pin 259; the wheels 66, 68 can be raised or lowered, as will later be described. Sleeve 250 is secured between mountings 252, 254 by a centrally disposed, elongated pin 260 which forms a bearing and enables the inclination plate 246 to be rotated in a plane perpendicular to the mounting bars 256 and to the frame members 50, 52. Pin ends 260A are welded to mounts 252, 254.

A desired angle of inclination is first selected depending upon soil or ground conditions. Once the desired angle of inclination is known or selected, it may be semi-permanently set by adjustment means generally indicated by the reference numeral 270. Means 270 includes an elongated, rigid, threaded rod 272 extending to and through the uppermost portion 246B of the inclination plate (FIG. 13) and a tab 274 projecting angularly upwardly from the upper surface 256A of the mounting bar 256. Compression of nuts 278 will respectively secure inclination plate 246 at a fixed distance with respect to mounting bar 256.

The mounting bars 256 terminate at their rears in plates 258 which mount conventional pillow blocks 282. Pivot pin 259 (FIG. 13) extends through a suitable sleeve 263 disposed within a suitable orifice defined in frame member 50 or 52. The outer ends of pivot pin 259 are secured with washers 261 welded in place relative to pillow blocks 282. Rotation of the mounting bars 256 is effectuated by displacement of a transverse rod 280 which extends between and is mechanically coupled to both of the mounting bars 256. Each mounting bar includes a pair of rigid, spaced-apart plates 284, 286 of generally rectangular dimensions which are weldably secured at opposite edges of the upper surface 256B of each mounting bar. The extreme ends 280B of rod 280 are weldably secured to plates 284, 286. Rod 280 extends through each frame member 50, 52, through elongated follower slots 290, which ultimately limits displacement of the mounting bars.

Figure 12:
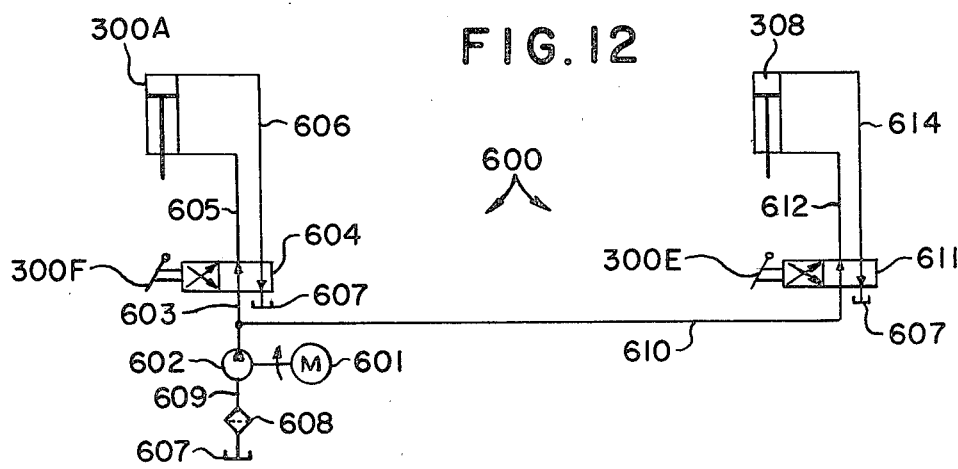
FIG. 12 is a schematic diagram of the preferred hydraulic control system.

The mounting bars are operated by a hydraulic system to be described later (FIG. 12). Conventional hydraulic means associated with the towing unit 22 including hand levers 300E (FIG. 1) operates compaction cylinder 308. Cylinder 308 is secured by pivots 308C to mounts 307C. Vertical stanchions 304 are welded to frame members 50, 52 at upper surface portions 52E thereof. Elongated control strut 306 is pivotally coupled between stachions 304 by rod 303 (FIG. 6). Tabs 307B secured to strut 306 are coupled to cylinder 308 with a pivot rod 308B.

Control arm link rod 280 extends transversely between frame members 50, 52 through follower slots 290 and a sleeve 314. A plate 312 welded to sleeve 314 mounts a rigid, threaded rod 310 which extends upwardly through springs 318, 320. Springs 318, 320 thus form a suspension system for control of compaction wheels 66, 68. It will thus be apparent that as cylinder 308 is actuated, resultant displacement of strut 306 will force rods 310, 280 upwardly, thereby pivoting mounting bars 256, and displacing compaction wheels 66, 68 against tension from springs 318, 320. The compaction wheels may thus be moved between limits established by follower slots 290. Control is effectuated by driver 38 with lever 300E.

Maneuverability and stability of the planter 20 is thus enhanced by a combination of effects. Since the angle of inclination of the compacting wheels may be varied, the system may be adapted for use with the ground of varying hardness or moisture content. Moreover, when the tow vehicle encounters large obstacles which must be avoided, the compaction wheels may be quickly disengaged simply by actuating cylinder 308. Synchronization rod 280 will maintain both wheels 66, 68 in a relatively uniform position relative to the frame, whereby to maintain balance. Similarly, the coulter wheel system may be adjusted as desired to either compensate for wear of the outer edges of the wheel 110, to compensate for moisture content in the ground, or to vary the desired furrow depth. Notwithstanding adjustments in the vertical position of coulter wheel 110, the wheel will remain centered because of the guiding or retention effects of the coulter mounting plate reinforcement guides 137B, 137C, 137E, 137F.

Figure 11:
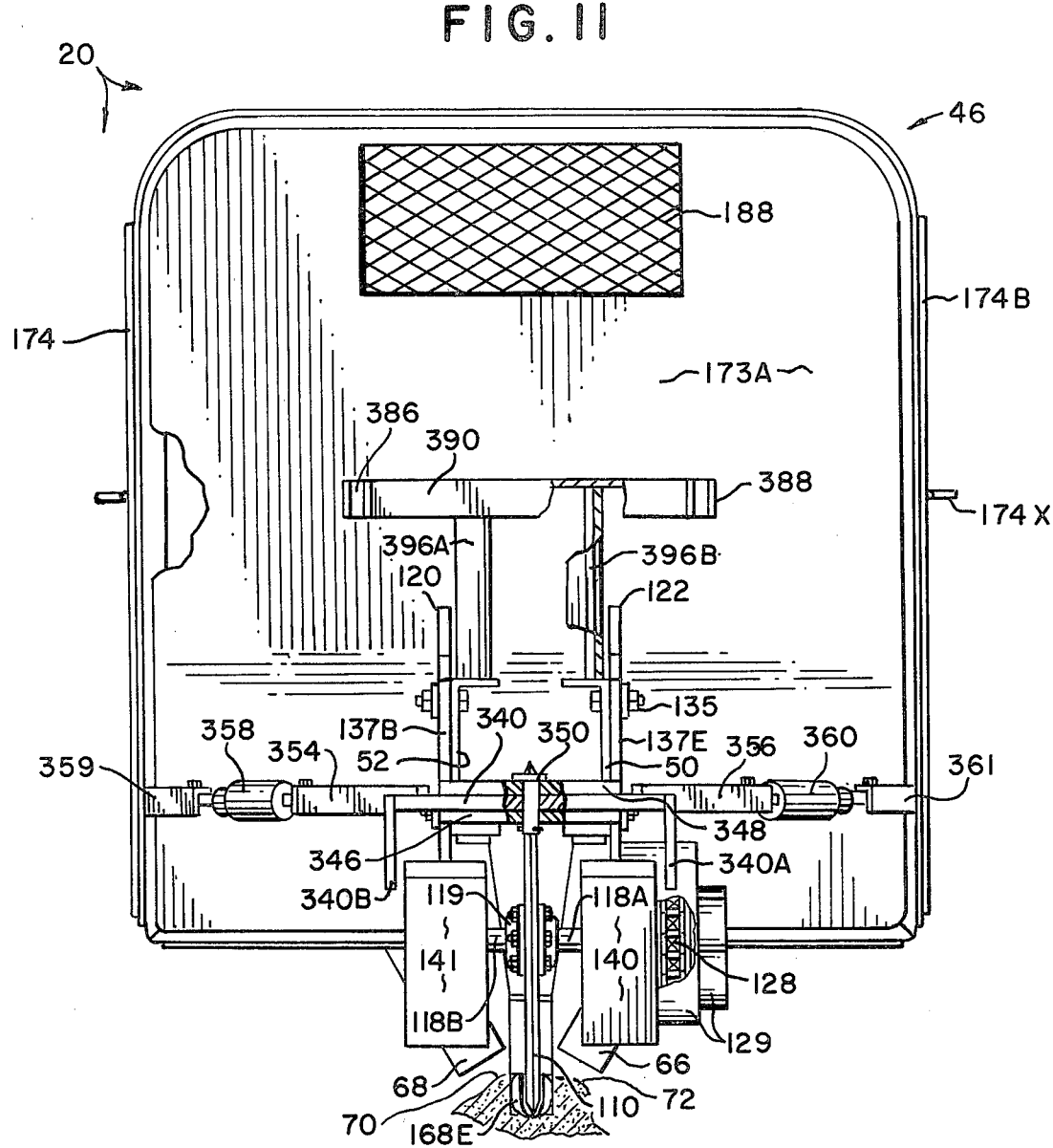
FIG. 11 is a rear plan view of the invention with parts thereof broken away, omitted, or shown in section for clarity.

Additional stability and maneuverability is effectuated by the towing system preferably employed. However, it is to be understood that the tow system may be varied as desired by the consumer or operator, and the system described is not mandatory. With primary reference now to FIGS. 6–8 and 11, the planter 20 includes a "fifth wheel" system comprising a rigid, generally rectangular horizontally disposed pivot plate 340 which is positioned through suitable slots provided in frame members 50, 52. As best viewed in FIG. 8 the slot is reinforced at its top and bottom by horizontal reinforcement plates 346, 348 which extend transversely between frame members and sandwich pivot plate 340 (FIG. 11). Rod 350 extends through plates 340, 346 and 348 to mount pivot plate 340. Opposite sides of pivot plate 340 are weldably secured to outwardly extending pivot bars 354, 356 which are pivotally coupled to shock absorbers 358, 360, coupled to housing 46 by struts 359, 361 respectively. Thus twisting of plate 340 is yieldably resisted by shock absorbers 358, 360. However, planter maneuvering is facilitated.

Tongue portions 370 extending rearwardly from the tow vehicle 22 are conventional. Transverse pivot coupling means 377 (FIG. 1) is adapted to be secured to trailer links 340A, 340B (FIG. 11) which extend downwardly from pivot plate 340 at opposite sides thereof. Additional towing support is provided by chains 382 (FIG. 1) extending from the tractor to opposite pivot connections 386, 388 (FIG. 11) on opposite sides of a transverse tow brace 390. Brace 390 is weldably secured to upwardly extending channel stachions 396A, 396B which are weldably secured to and extend perpendicularly upwardly from frame members 50, 52. Additional reinforcement is provided by diagonal struts 397A, 397B (FIGS. 7,8) extending from the frame transverse bar 390. Tractor cylinder 300A, actuated by lever 300F, controls mounting adjustment.

With reference now to FIG. 12, the hydraulic control system 600 is powered by a tractor mounted motor 601 which drives a conventional hydraulic pump 602. Hydraulic pressure is transmitted to a conventional two-way hydraulic valve 604 via a line 603. Valve 604 communicates with cylinder 300A via lines 605, 606. Fluid is transferred into conventional reservoir 607 for eventual return to the system motor 602 via conventional filter 608 and line 609. Hydraulic cylinder 300A, which controls the tractor towing mount, is controlled by hand lever 300F.

The compaction wheels previously discussed are controlled by cylinder 308 which is operated by a conventional two-way hydraulic valve 611. Valve 611 is coupled to pump 602 by a line 610. Valve 611 is coupled to cylinder 308 by lines 612, 614. Compaction wheel control is effectuated by hand lever 300E.

With the "fifth wheel" structure described reliable tow coupling will be facilitated notwithstanding ground level variations or sharp tow vehicle turns. Moreover, the previously described compaction wheel system compliments the towing system to facilitate maneuverability and ease of operation. It should be appreciated that the unique seedling feeding system comprised of yieldable or deformable plastic or rubber hands will not be damaged during extreme maneuvers or variations in tow vehicle travel.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A heavy duty seedling planting device comprising:

elongated, rigid frame means comprising a pair of elongated, parallel channel members; said frame means having a front and a rear;

furrow cutting means secured to said frame means for opening a furrow in which seedlings are to be planted, said furrow cutting means comprising:
  coulter wheel means rotatably secured between said frame channel members for cutting a furrow; and,
  plow means secured to said frame means and depending downwardly therefrom for widening said furrow, said plow means comprising rigid, spaced-apart plates forwardly converging in a lower point adjacent said coulter wheel means;

feed wheel means for inserting said seedlings into said furrow, said feed wheel means comprising:
  rotatable hub means mounted for rotation with respect to said frame means in a plane generally perpendicular to ground;
  a plurality of planting hands secured to said hub means at radially spaced-apart intervals thereon and revolved thereby; the planting hands operable to receive seedlings and to afterwards insert them into said furrow; and,
  one way clutch means for preventing reverse rotation of said hub means while facilitating limited slip in response to overload;

compression pathway means for temporarily closing said planting hands after they receive a seedling to be planted whereby to retain said seedling within said hand until the seedling is appropriately positioned for insertion into said furrow and for subsequently releasing said hand to effectuate seedling release;

chain means coupled between said feed wheel means and said coulter wheel means for rotating said planting hands between seedling receptive and seedling inserting positions; and, compaction means for repacking said furrow after insertion of a seedling, said compaction means comprising:

a pair of elongated, rigid mounting bars disposed on opposite sides of said frame means, said mounting bars pivotally coupled to said frame means at the rear end thereof for rotation in a plane generally perpendicular to the ground and parallel to said coulter means;

a rotatable, rigid, metallic compacting wheel mounted on each of said mounting bars by inclination means pivotally secured to said mounting bars, said inclination means permitting user selectable variance in the inclination of each compacting wheel;

elongated, rigid rod means extending between said mounting bars for synchronizing same, said rod means extending through said frame means within an arcuate travel limiting slot provided therein; and, hydraulic ram means coupled to said last mentioned rod means for pivoting said mounting bars to engage or disengage the compaction wheels.

2. The combination as defined in claim 1 wherein said compression pathway means comprises generally arcuate rails disposed in spaced-apart, generally parallel relation, each rail including portions thereof secured within said plow means to one of said plow means plates.

3. The combination as defined in claim 2 wherein:
said planting device includes cab means secured to said frame means for providing a sheltered enclosure for an operator;
said planting hands are manually accessible by said operator interiorly of said cab means; and,
said cab means includes a seat for said operator on each side of said feed wheel means.

4. The combination as defined in claim 3 including adjustable mounting means for mounting said coulter wheel means relative to said frame means whereby to permit adjustment in the depth of furrows being cut, said adjustable coulter mounting means including:
rigid coulter plates secured to said frame on opposite front sides thereof;
a plurality of elongated slots formed in said plates through which mounting bolts may pass for attachment to said frame means; and,
rigid guide means secured to said frame means in abutting, aligning relation with respect to said coulter plates for preventing longitudinal displacement of said coulter plates with respect to said frame means.

5. The combination as defined in claim 4 including fifth wheel means secured to said frame means for coupling said device to a tow vehicle for moving it over ground in which said tree seedlings are to be planted, said fifth wheel means including a pivot plate pivotally secured to said frame means and general parallel with ground level and perpendicular to said coulter wheel means, and shock absorber means coupled between said plate and said frame means.

6. The combination as defined in claim 5 including a treaded drive wheel keyed to a coulter wheel axle for insuring rotation of said coulter wheel.

* * * * *